US011449411B2

(12) United States Patent
Perkins, Jr. et al.

(10) Patent No.: US 11,449,411 B2
(45) Date of Patent: Sep. 20, 2022

(54) APPLICATION-SPECIFIC LOG ROUTING

(71) Applicant: Red Hat, Inc., Raleigh, NC (US)

(72) Inventors: James R. Perkins, Jr., Government Camp, OR (US); David M. Lloyd, Belleville, WI (US)

(73) Assignee: Red Hat, Inc., Raleigh, NC (US)

( * ) Notice: Subject to any disclaimer, the term of this patent is extended or adjusted under 35 U.S.C. 154(b) by 13 days.

(21) Appl. No.: 16/890,707

(22) Filed: Jun. 2, 2020

(65) Prior Publication Data
US 2021/0374036 A1    Dec. 2, 2021

(51) Int. Cl.
*G06F 11/36* (2006.01)
*G06F 9/445* (2018.01)

(52) U.S. Cl.
CPC ........ *G06F 11/364* (2013.01); *G06F 9/44521* (2013.01); *G06F 11/3612* (2013.01); *G06F 11/3664* (2013.01)

(58) Field of Classification Search
USPC ....................................................... 717/125
See application file for complete search history.

(56) References Cited

U.S. PATENT DOCUMENTS

| | | | | |
|---|---|---|---|---|
| 7,640,337 B1* | 12/2009 | Fultz | .................. | G06F 11/3612 709/203 |
| 7,783,750 B1* | 8/2010 | Casey | .................... | H04L 67/36 709/224 |
| 8,578,393 B1* | 11/2013 | Fisher | ................. | G06F 11/3476 719/313 |
| 9,578,063 B1 | 2/2017 | Iyer et al. | | |
| 10,484,234 B1 | 11/2019 | Sun et al. | | |
| 10,599,668 B2* | 3/2020 | McLean | ................. | G06F 40/205 |
| 2003/0131282 A1* | 7/2003 | Lowen | ................ | G06F 11/0787 714/20 |
| 2004/0153878 A1* | 8/2004 | Bromwich | .......... | G06F 11/3636 714/48 |
| 2005/0027783 A1* | 2/2005 | Green | ................. | G06F 11/3636 709/200 |
| 2008/0288599 A1* | 11/2008 | Kutchmark | ......... | H04L 63/0807 709/206 |

(Continued)

FOREIGN PATENT DOCUMENTS

| | | |
|---|---|---|
| CN | 106155864 | 10/2018 |
| CN | 110334071 | 10/2019 |
| CN | 106547470 | 1/2020 |

OTHER PUBLICATIONS

Appenders, http://logging.apache.org/log4j/2.x/manual/appenders.html, 2020, Log4J, 49 pages.

(Continued)

*Primary Examiner* — Ryan D. Coyer
(74) *Attorney, Agent, or Firm* — Lowenstein Sandler LLP

(57) ABSTRACT

Implementations for application-specific log routing are described. An example method may include receiving, by an application server, a log message; responsive to determining that a log router associated with the application server is enabled, identifying a thread context associated with an execution thread that created the log message; responsive to identifying a logger associated with the thread context, forwarding the log message to the logger; and processing the log message by the logger.

20 Claims, 4 Drawing Sheets

(56) References Cited

U.S. PATENT DOCUMENTS

2010/0049747 A1* 2/2010 Yang ................... G06F 11/3636
707/648
2018/0359317 A1* 12/2018 Muthiah ................. H04L 69/40

OTHER PUBLICATIONS

Gülcü et al., Logback Configuration, http://logback.qos.ch/manual/configuration.html, 2000-2017, QOS.ch, 17 pages.
Kristensen, R, Configuration File, https://github.com/nlog/nlog/wiki/configuration-file, 2020, GitHub, Inc., 15 pages.

* cited by examiner

APPLICATION-SPECIFIC LOG ROUTING

TECHNICAL FIELD

The disclosure is generally related to logging frameworks systems, and more particularly, to application-specific log routing.

BACKGROUND

A log is created to record events that occur in an operating system, application server, application, or other software. Developers rely on logs to provide an audit trail that can be used to understand and diagnose errors in computer programs.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Figure 1:
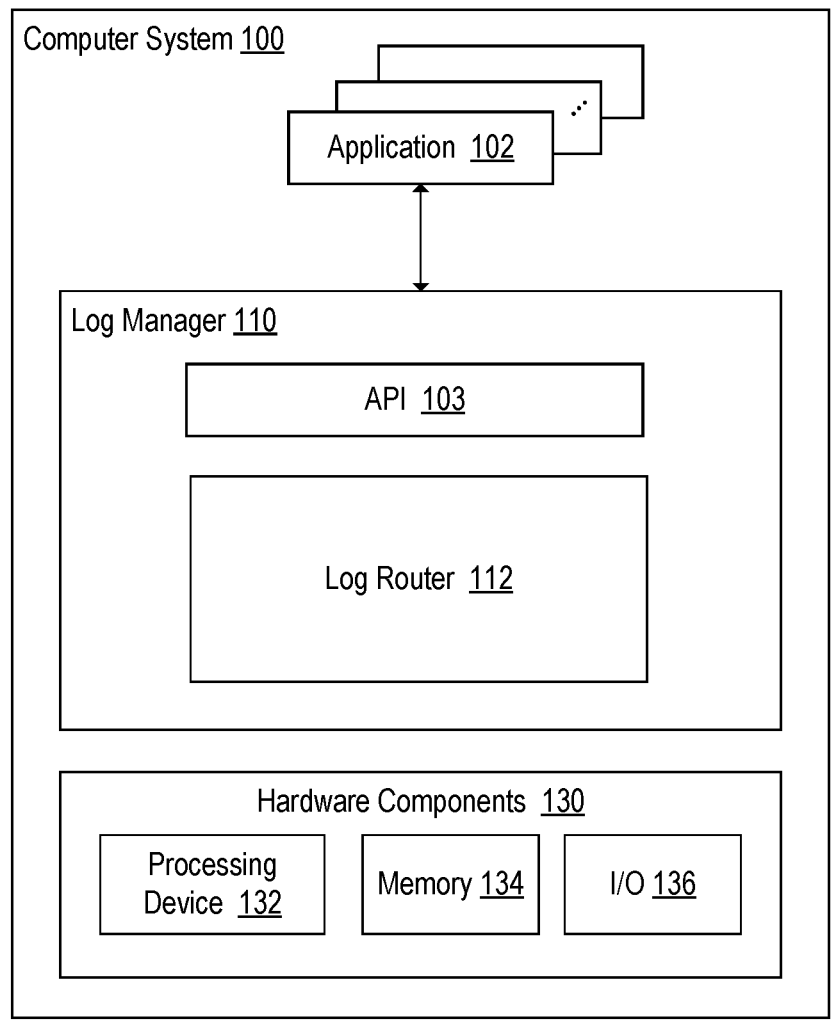
FIG. 1 depicts a high-level block diagram of an example computer system architecture, in accordance with one or more aspects of the disclosure.

Described herein are systems and methods for application-specific log routing. Applications running on an application server (such as JBOSS Enterprise Application Platform) may include logging capabilities that enable recordation of certain messages. The messages may be warning messages, error messages, or informational messages, such as runtime statistics. The process of recording log messages during the execution of a program is called logging. Logging may provide a detailed account of what occurred in the execution environment at a certain moment in time or during a certain period of time. Logging may help track activity that occurred just before a crash or problem in the execution environment, which may provide useful information when troubleshooting or when attempting to identify the source of a crash or error. A logger is the object that performs the logging for a specific system or application component.

In some implementations, an application server may run one or more applications (e.g., bytecode applications, such as Java applications), and each application may include one or more execution threads. In such an execution environment, log messages may be generated by the application server itself, the application server's dependencies, or the applications running on the application server. Log messages may be processed by one or more loggers, which are functional components performing various tasks, including storing log messages in a log file, presenting log messages via a user interface, performing a message-triggered workflow, transmitting a message-triggered notification, etc. Each logger may be associated with a log context, which may define various logging parameters (e.g., log file path and/or name, user interface presentation parameters, notification parameters, etc.).

When a static logger is created, it is associated with a specific log configuration. An application may define a log configuration context by using a logging profile or a log configuration file. That is, the logging profile or log configuration file dictates on which context the log message is processed. If an application that includes a log configuration and a context is configured, then all loggers for the application are created on that specific context. Log messages may be grouped by context for organizational purposes. If an application that is part of the server creates a logger, the log configuration context of the logger is the default server context. Consequently, in conventional systems, all server log messages are logged on the default server context and all application log messages are logged on the application's context.

In some cases, a server may have a set of dependencies that all log to the server's default context. An application running on the server may use a log context associated with the server. That is, when an application is deployed to an application server, the application's log messages may be captured by the server and processed according to the server's configuration.

In some implementations, in conventional systems, when two or more deployments depend on the same custom module, the first deployment to initialize the custom module creates a logger on the log context specified in that deployment's logging profile. This may result in logs from all deployments being sent to the logger associated with the custom module. However, it may be desirable to route log messages to loggers on a different context, e.g., associated with only one of the deployments.

Aspects of the present disclosure address the above and other deficiencies by implementing a log router to route log messages according to the log message's thread context. Responsive to receiving a log message, the application server may determine whether the log router is enabled (e.g., by inspecting the message metadata and/or server configuration settings). If the log router is enabled, the application server may identify the thread context associated with an execution thread that created the log message. The execution thread may be a bytecode application, for example. The log message may then be forwarded to the logger associated with the thread context. If such a logger does not exist, the application server may create the logger. Finally, if the log router is disabled, the log message may be processed by the default logger.

As a result, a server may route server log messages associated with an application to the application's log configuration context. For example, an application may run an SQL query where the SQL library is on the server. Conventionally this query would be logged at the default server level. However, since the query is run by an application, it would be preferable to log the query on the application's context. Aspects of the present disclosure describe a method to route a log message associated with the query according to the log message's thread context, resulting in the query being logged on the application's context instead of the server context.

The systems and methods described herein include technology that enhances the overall performance of computer systems by limiting loggers to necessary contexts, ensuring that all log messages are transmitted to the appropriate logger. In particular, aspects of the disclosure provide technology that enhances the efficiency and reduce overall system latency by providing a streamlined and efficient method to route log messages to their appropriate contexts.

Various aspects of the above referenced methods and systems are described in details herein below by way of examples, rather than by way of limitation.

FIG. 1 illustrates a computer system 100, in which embodiments of the invention may operate. It should be noted that other architectures for computer system 100 (also referred to herein as system 100) are possible, and that the implementation of a computer system utilizing embodiments of the disclosure are not necessarily limited to the specific architecture depicted by FIG. 1. Terms such as "machine," "device," "computer," and "computing system" may be used interchangeably and synonymously throughout this document.

Computer system 100 may include a single computer system or multiple computer systems arranged in a heterogeneous or homogeneous group (e.g., cluster). Computer system 100 may include computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to establish controlled remote access to debug logs. In one example, computer system 100 may include a computing device implemented with x86 hardware. In another example, computer system 100 may include a computing device implemented with PowerPC®, SPARC®, or other hardware. Computer system 100 may include one or more virtual machines and a hypervisor. In some implementations, the computer system 100 may be located in a data center.

In certain embodiments, computer system 100 may be an application server (i.e., a server that hosts applications). Computer system 100 may include an operating system (OS) (not shown) to manage system resources, including access to hardware components 130. Hardware components 130 may include one or more processing devices 132, memory 134, and input/output devices (I/O) 136. Computer system 100 may include additional or different components, devices, and/or connectors in various implementations of the disclosure. Hardware components 130 may provide hardware functionality for performing various computing tasks.

Application 102 may be any type of applications, including, for example, bytecode applications (e.g. Java applications). Additionally or alternatively, application 102 may be browser applications, web applications, desktop applications, etc. Application 102 may run on an application server, or may run on separate computing devices. Log manager 110 may reside on the application server.

One or more processors may be embodied as processing device 132, which can be a micro-processor, digital signal processor (DSP), or other processing component. Processing device 132 may process various received data and may carry out the code or instructions or one or more computer programs, for example, to provide input/output operations specified by the instructions. Processing device 132 may be capable of executing the computing tasks described in the present disclosure. Processing device 132 may be a single core processor that is capable of executing one instruction at a time (e.g., single pipeline of instructions) or may be a multi-core processor that simultaneously executes multiple instructions. The instructions may encode arithmetic, logical, or I/O operations. In one example, processing device 132 may be implemented as a single integrated circuit, two or more integrated circuits, or may be a component of a multi-chip module (e.g., in which individual microprocessor dies are included in a single integrated circuit package and hence share a single socket).

Memory 134 may include volatile memory devices (e.g., random access memory (RAM)), non-volatile memory devices (e.g., flash memory), ROM (read-only memory), EEPROM (electrically erasable programmable read-only memory), and/or other types of memory devices), and a storage device (e.g., a magnetic hard disk, a Universal Serial Bus (USB) solid state drive, a Redundant Array of Independent Disks (RAID) system, a network attached storage (NAS) array, etc.). Various data of the computer system 100 may be stored in memory 134.

Computer system 100 may include one or more repository (not shown) to store various data. The one or more repository may be hosted by one or more storage devices, such as main memory, magnetic or optical storage based disks, tapes or hard drives, NAS, SAN, and so forth. The one or more repository may be separate from the computer system 100, or the one or more repository may be part of one or more of the computer system 100. In some implementations, the one or more repository may be a network-attached file server, while in other embodiments one or more repository may be some other type of persistent storage such as an object-oriented database, a relational database, a non-relational database, and so forth, that may be hosted by a server machine or one or more different machines coupled to the one or more repository via a network (not shown).

Input/output device (I/O) 136 may be and/or include a device capable of providing an interface between a processor and an external device capable of inputting and/or outputting binary data. In some implementations, the computer system 100 may comprise a plurality of I/O devices, In some implementations, computer system 100 may be connected to a network (not shown), which may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

Processing device 132 may execute an operating system (OS) (not shown), as well as sub-programs and/or applications of the OS to provide various features and embodiments described herein. The OS may support one or more services or applications 102. In some examples, an application 102 may include user application processes, virtual machines, containers, and the like. The applications and services running on computing devices within computer system 100 may receive data through the network (not shown). The OS may provide an abstraction layer for the resources (especially processing device 132, memory 134, and I/O devices 136) that the applications and services may control to perform their function. The OS typically makes these resources available to the applications and services through inter-process communication mechanisms and system calls.

Implementations of the disclosure provide for routing log messages. In one example, an application server may run one or more applications 102. The application server, the server's dependencies, or the applications 102 running on the application server may generate log messages. Application programming interface (API) 103 of log manager 110 on the application server may intercept each log message. API 103 may determine whether the log message has enabled the log router. For example, API 103 may inspect the log message's metadata to determine if the log router is enabled. The log generator (e.g., application 102) may create a new metadata field within the log to indicate that the router has been enabled. Alternatively, the log generator may use an existing field in the log message's metadata to indicate to API 103 that the log router has been enabled. In another example, API 103 may inspect the server configuration settings to determine if the log router is enabled. If the log router is enabled, API 103 may transmit the log message to the log router 112, which may then determine on which context to log the message.

The log router 112 may identify a thread context associated with the execution thread that created the log message. In some examples, the execution thread is a bytecode application. Log router 112 may invoke a class loader associated with the execution thread in order to identify the thread context. Log router 112 may identify a logger associated with the thread context. If the log router 112 cannot identify a logger associated with the thread context, the log router 112 may create a logger associated with the thread context. Then, the log router 112 may forward the log message to the logger, which may process the log message.

Alternatively, if the log router is not enabled in the log message, the API 103 may transmit the log message to the logger on the default context, as is done in conventional logging frameworks. That is, if the log router is disabled, the log message may be processed by a default logger associated with the component that produced the log message.

Figure 2:
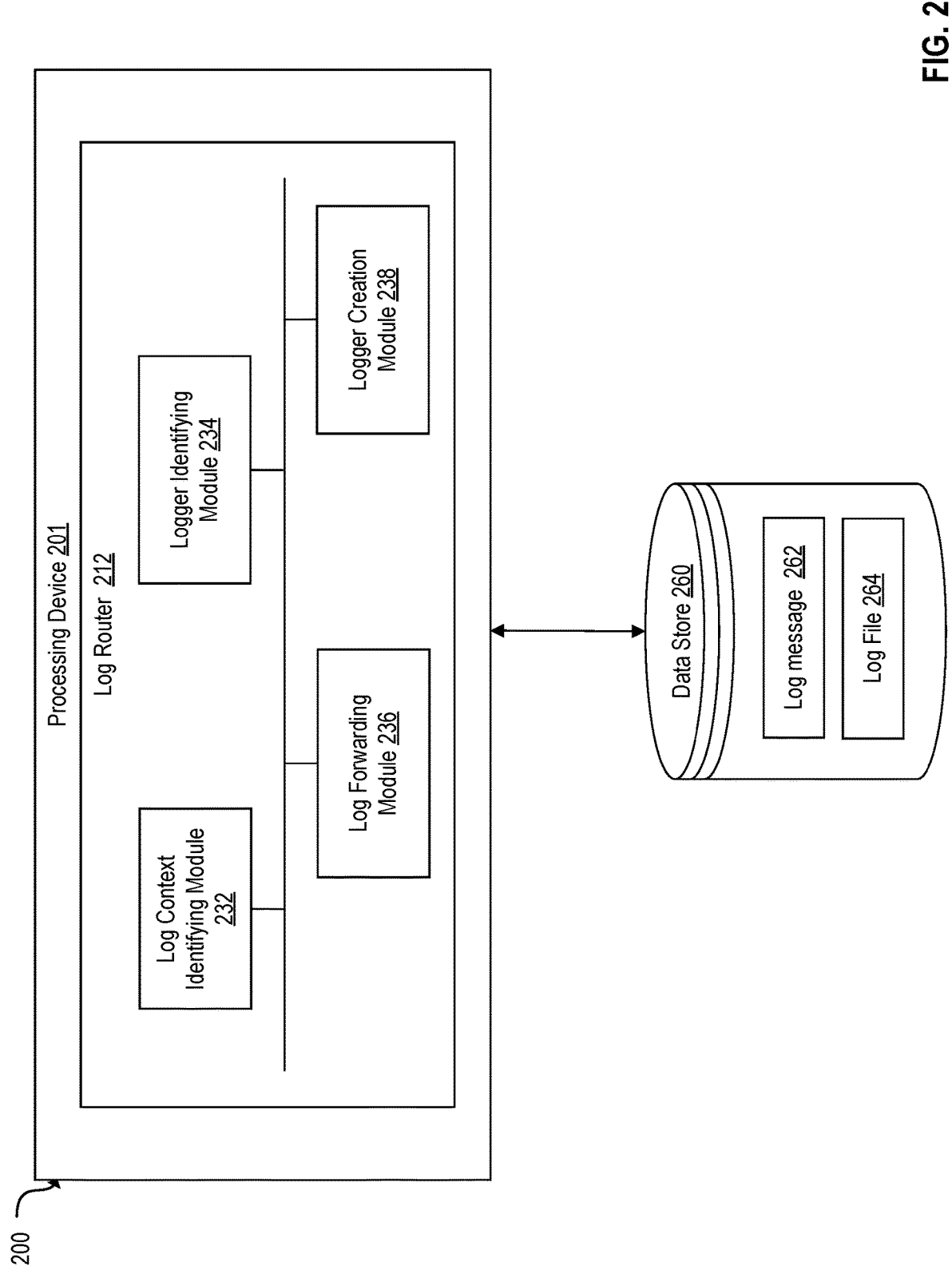
FIG. 2 depicts a block diagram of an example computer system, in accordance with one or more aspects of the disclosure.

FIG. 2 is depicts a block diagram of an example computer system 200 in accordance with one or more aspects of the disclosure. Computer system 200 may perform the same functions as the computer system 100 of FIG. 1, and may include one or more processing devices 201, and one or more memory devices such as data store 260. In the example shown, the processing device 201 of computer system 200 may include a log router 212, which in turn may include a log context identifying module 232, a logger identifying module 234, a log forwarding module 236, and a logger creation module 238. The log router 212 may include additional and/or different modules and submodules. Log router 212 may perform the same functions as log router 112 described with respect to FIG. 1.

Log router 212 may be running on an application server, which may run one or more applications. The server, the server's dependencies, or the applications running on the server may generate a log message. An application programming interface running on the processing device 201 may determine whether the log router associated with the application server is enabled, for example by inspecting the log message's metadata. If the log router is disabled, the application programming interface may process the log message by a default logger associated with the component that produced the log message. If the log router is enabled, the application programming interface may transmit the log message to the log router 212.

The log message may be stored in log message 262 in data store 260. Log messages may contain certain contextual information, such as, for example, a date and timestamp of when the log was created, the nature of the message (e.g., whether is it reporting a bug in a computer program, or whether it contains statistical information), the log level (e.g., critical, error, warning, info, debug, trace, etc.), the log category, and/or the message text. Log messages may also include metadata that provide additional details about the log message, for example, whether the log router is enabled.

Log router 212 may include a log content identifying module 232, a logger identifying module 234, a log forwarding module 236, and a logger creation module 238.

Log context identifying module 232 may enable the processing device 201 to identify a thread context associated with the execution thread that created the log message 262. A thread may be an independent path of execution for components of a computer program. Each thread may be scheduled to execute instructions on a processor based on the operating system on which the program is running. Consequently, each thread may create one or more log messages during execution. Log context identifying module 232 may invoke a class loader in order to identify the thread context associated with the execution thread that created the message.

Logger identifying module 234 may then enable the processing device 201 to identify a logger associated with the thread context. If the logger identifying module 234 fails to identify a logger associated with the thread context, the logger creation 238 may enable the processing device 201 to create the logger. The log forwarding module 236 may then enable the processing device 201 to forward the log message 262 to the logger associated with the thread context.

The logger may then process the log message, for example by storing the log message in a log file associated with the logger (such as log file 264 in data store 260). Additionally or alternatively, the logger may present the log message via a user interface (not shown).

Figure 3:
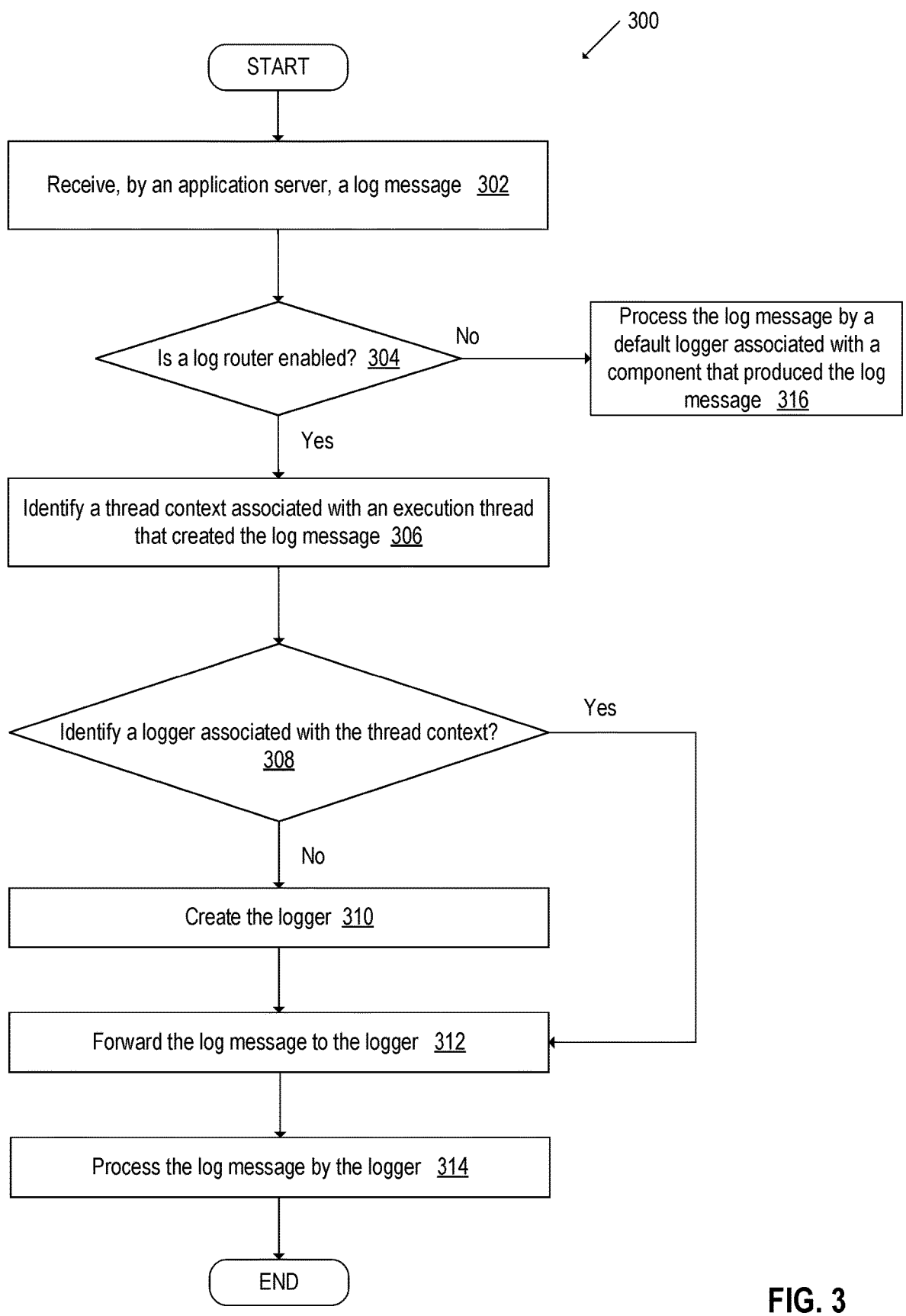
FIG. 3 depicts a process flow diagram of an example method for routing log messages to the appropriate log context, in accordance with one or more aspects of the disclosure.

FIG. 3 depicts a flow diagram for illustrative examples of method 300 for routing log messages to the appropriate logger context, in accordance with one or more aspects of the disclosure. Method 300 may be performed by processing devices that may comprise hardware (e.g., circuitry, dedicated logic, programmable logic, microcode, etc.), executable code (such as is run on a general purpose computer system or a dedicated machine), or a combination of both. Method 300 and its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure may occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or memory page media. In one implementation, method 300 may be performed by log manager 110 as shown in FIG. 1.

Referring to FIG. 3, method 300 may be performed by processing devices of an application server device and may begin at block 302. At block 302, the processing device may receive a log message. The log message may be generated by the application server itself, by one of the server's dependencies, or by one of the applications running on the application server. The log message may include at least a timestamp, a log level, a log category, and/or a message text.

The log message may also include a metadata field indicating whether a log router has been enabled. At block 304, the processing device may determine whether the log router is enabled. That is, the processing device may determine the value of the field in the log message's metadata that indicates whether a log router has been enabled. For example, the field may be a Boolean field, which if it is set to true, indicates that the log router is enabled. If it is set to false, this may indicate that the log router is not enabled. In another example, the processing device may inspect the server configuration settings to determine whether the log router is enabled. If the log router is not enabled, the processing device may move on to block 316. At block 316, the processing device may process the log message by a default logger associated with the component that produced the log message.

Upon determining that the log router is enabled, the processing device may identify a thread context associated with the execution thread that created the message at block 306. The processing device may identify the thread context using a variety of appropriate methods. In one implementation, for example, the processing device may invoke a class loader associated with the execution thread in order to identify the thread context.

At block 308, the processing device may identify a logger associated with the thread context. If the processing device fails to identify a logger associated with the thread context, the processing device may create the logger at block 310, and then forward the log message to the newly created logger at block 312. Alternatively, responsive to successfully identifying a logger associated with the thread context, the processing device may forward the log message to the identified logger at block 312. Finally, at block 314, the logger may process the log message. For example, the logger may store the log message in a file associated with the logger, or the logger may present the log message via a user interface.

Figure 4:
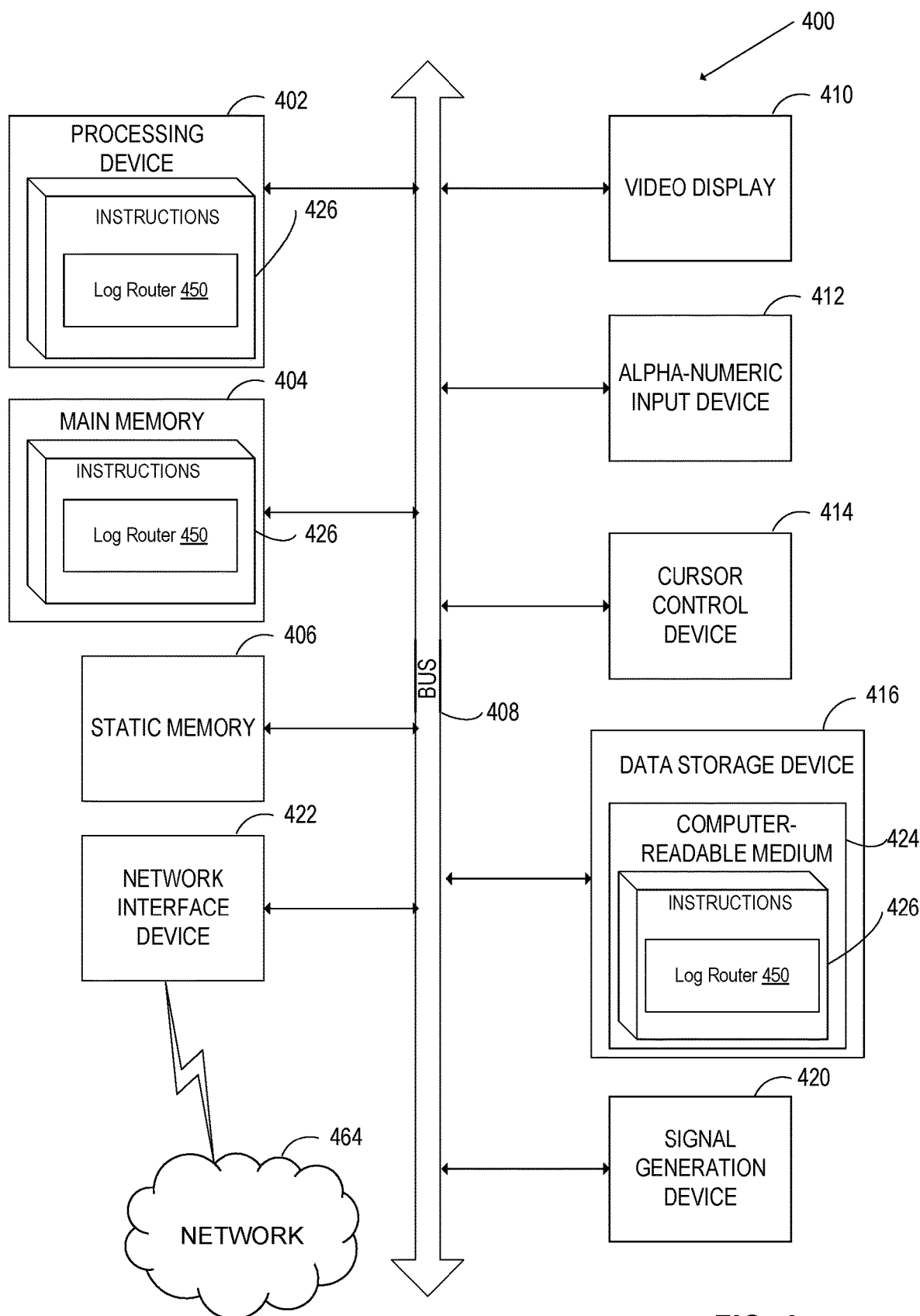
FIG. 4 depicts a block diagram of an illustrative computing device operating in accordance with the examples of the disclosure.

FIG. 4 depicts a block diagram of a computer system operating in accordance with one or more aspects of the disclosure. In various illustrative examples, computer system 400 may correspond to the computer system 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 400 may be connected (e.g., via a network, such as a Local Area Network (LAN), an intranet, an extranet, or the Internet) to other computer systems. Computer system 400 may operate in the capacity of a server or a client computer in a client-server environment, or as a peer computer in a peer-to-peer or distributed network environment. Computer system 400 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 400 may include a processing device 402, a volatile memory 404 (e.g., random access memory (RAM)), a non-volatile memory 406 (e.g., read-only memory (ROM) or electrically-erasable programmable ROM (EEPROM)), and a data storage device 416, which may communicate with each other via a bus 408.

Processing device 402 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 400 may further include a network interface device 422. Computer system 400 also may include a video display unit 410 (e.g., an LCD), an alphanumeric input device 412 (e.g., a keyboard), a cursor control device 414 (e.g., a mouse), and a signal generation device 420.

Data storage device 416 may include a non-transitory computer-readable storage medium 424 on which may store instructions 426 encoding any one or more of the methods or functions described herein, including instructions for implementing method 300 for log router 450 (which may implement the functions of log router 112 of FIG. 1 and/or resource router 212 of FIG. 2) and the modules illustrated in FIGS. 1, and 2.

Instructions 426 may also reside, completely or partially, within volatile memory 404 and/or within processing device 402 during execution thereof by computer system 400, hence, volatile memory 404 and processing device 402 may also constitute machine-readable storage media.

While computer-readable storage medium 424 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "detecting," "verifying," "evicting," "selecting," "restricting," "receiving," "updating," "providing" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation. Furthermore, "requestor" and "initiator" are used interchangeably throughout this disclosure.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it will be recognized that the disclosure is not limited to the examples and implementations described. The scope of the disclosure should be determined with reference to the following claims, along with the full scope of equivalents to which the claims are entitled.

What is claimed is:

1. A method comprising:
   receiving, by an application server, a log message;
   identifying an execution thread that created the log message;
   responsive to determining that a log router associated with the application server is enabled, identifying a thread context associated with the execution thread;
   identifying, based on the thread context, a logger;
   forwarding the log message to the logger; and
   processing the log message by the logger.

2. The method of claim 1, further comprising:
   responsive to failing to identify the logger associated with the thread context, creating the logger.

3. The method of claim 1, wherein determining that the log router is enabled further comprises determining that a predetermined metadata field of the log message is set to a specified value.

4. The method of claim 1, wherein identifying the thread context further comprises invoking a class loader associated with the execution thread.

5. The method of claim 1, wherein the log message comprises at least one of: a timestamp, a log level, a log category, or a message text.

6. The method of claim 1, wherein the execution thread is a bytecode application.

7. The method of claim 1, further comprising:
   responsive to determining that the log router is disabled, processing the log message by a default logger associated with a component that produced the log message.

8. The method of claim 1, wherein processing the log message further comprises at least one of: storing the log message in a log file associated with the logger or presenting the log message via a user interface.

9. A system comprising:
   a memory; and
   a processing device communicatively coupled to the memory to:
   receive, by an application server, a log message;
   identify an execution thread that created the log message;
   responsive to determining that a log router associated with the application server is enabled, identify a thread context associated with the execution thread;
   identify, based on the thread context, a logger;
   forward the log message to the logger; and
   process the log message by the logger.

10. The system of claim 9, wherein the processing device is further to:
    responsive to failing to identify the logger associated with the thread context, creating the logger.

11. The system of claim 9, wherein determining that the log router is enabled further comprises the processing device to determine that a predetermined metadata field of the log message is set to a specified value.

12. The system of claim 9, wherein identifying the thread context further comprises the processing device to invoke a class loader associated with the execution thread.

13. The system of claim 9, wherein the log message comprises at least one of: a timestamp, a log level, a log category, or a message text.

14. The system of claim 9, wherein the processing device is further to, responsive to determining that the log router is disabled, process the log message by a default logger associated with a component that produced the log message.

15. A non-transitory computer readable storage medium including instructions that, when executed by a processing device, cause the processing device to perform a method comprising:
    receiving, by an application server, a log message;
    identifying an execution thread that created the log message;
    responsive to determining that a log router associated with the application server is enabled, identifying a thread context associated with the execution thread;
    identifying, based on the thread context, a logger;
    forwarding the log message to the logger; and
    processing the log message by the logger.

16. The non-transitory computer readable storage medium of claim 15, further comprising:

responsive to failing to identify the logger associated with the thread context, creating the logger.

17. The non-transitory computer readable storage medium of claim 15, wherein determining that the log router is enabled further comprises determining that a predetermined metadata field of the log message is set to a specified value.

18. The non-transitory computer readable storage medium of claim 15, wherein identifying the thread context further comprises invoking a class loader associated with the execution thread.

19. The non-transitory computer readable storage medium of claim 15 wherein the log message comprises at least one of: a timestamp, a log level, a log category, or a message text.

20. The non-transitory computer readable storage medium of claim 15, wherein processing the log message further comprises at least one of: storing the log message in a log file associated with the logger or presenting the log message via a user interface.

* * * * *